(12) United States Patent
Bader et al.

(10) Patent No.: US 7,476,095 B2
(45) Date of Patent: Jan. 13, 2009

(54) DEVICE FOR FORMING OBJECTS, COMPRISING A COUPLABLE PRESSURE OR TEMPERATURE SENSOR

(75) Inventors: Christopherus Bader, Neftenbach (CH); David Dreher, Neftenbach (CH)

(73) Assignee: Priamus System Technologies AG (CH)

( * ) Notice: Subject to any disclaimer, the term of this patent is extended or adjusted under 35 U.S.C. 154(b) by 0 days.

(21) Appl. No.: 11/662,129

(22) PCT Filed: Sep. 2, 2005

(86) PCT No.: PCT/EP2005/009464

§ 371 (c)(1),
(2), (4) Date: Mar. 6, 2007

(87) PCT Pub. No.: WO2006/027173

PCT Pub. Date: Mar. 16, 2006

(65) Prior Publication Data

US 2007/0248715 A1 Oct. 25, 2007

(30) Foreign Application Priority Data

Sep. 6, 2004 (DE) .................. 10 2004 043 443

(51) Int. Cl.
*B28B 17/00* (2006.01)
(52) U.S. Cl. .................. 425/170; 425/192 R; 425/144; 425/149
(58) Field of Classification Search ............ 425/192 R, 425/144, 149, 170
See application file for complete search history.

(56) References Cited

U.S. PATENT DOCUMENTS

| 5,560,939 | A | * | 10/1996 | Nakagawa et al. | ........... 425/139 |
| 6,212,963 | B1 | | 4/2001 | Bader et al. | |
| 6,345,974 | B1 | * | 2/2002 | Kawasaki et al. | ........... 425/149 |
| 6,389,903 | B1 | * | 5/2002 | Oba et al. | ..................... 73/756 |
| 2003/0062776 | A1 | * | 4/2003 | Skibinski et al. | ............ 307/105 |

FOREIGN PATENT DOCUMENTS

| DE | 39 39 728 | 6/1991 |
| DE | 101 14 228 | 10/2002 |
| WO | WO 02/082023 | 10/2002 |

OTHER PUBLICATIONS

Bader, The ABC of Mould-Sensor Systems, Jun. 2006, from Kunstoffe; pp. 114-117.*

(Continued)

*Primary Examiner*—Yogendra Gupta
*Assistant Examiner*—Maria Veronica D Ewald
(74) *Attorney, Agent, or Firm*—Bachman & LaPointe, P.C.

(57) ABSTRACT

A device for forming objects in a cavity, the device being at least partially formed by an insert in a molding plate. A sensor is arranged in the insert towards the inner wall of the cavity embodied by the insert, the sensor being connected to a first coupling part with which a second coupling part is to be associated in the molding plate.

7 Claims, 2 Drawing Sheets

OTHER PUBLICATIONS

Gut H: "Quarzkristall-Druckaufnehmer Fuer Plastische Formmassen" Plastverarbeiter, Huethig Gmbh, Heidelberg, DE, vol. 27, No. 5, May 1976, pp. 265-266, XP001194118 ISSN: 0032-1338.
Company Product Specification: Type 6001 A—Standard Cavity Pressure Sensor, pp. 1 and 2, data sheet on pressure sensor "Type 6001 A", published on Oct. 2003.

Company Product Specification: Cable Concept for Piezoelectric Sensors, pp. 1 and 2, published on May 2003.

Company Product Specification: Cable Concept for Temperature Sensors, published on May 2003.

* cited by examiner

DEVICE FOR FORMING OBJECTS, COMPRISING A COUPLABLE PRESSURE OR TEMPERATURE SENSOR

BACKGROUND OF THE INVENTION

The invention relates to a device for forming objects in a cavity which is at least partially formed by an insert in a mold plate.

In the injection-molding process for example, objects are produced by filling a cavity in a mold, for example with thermoplastic materials. This forming operation must be monitored as it proceeds. For example, the filling operation is controlled in such a way that an initial speed-controlled phase is followed by a pressure-controlled phase, which lasts until the end of the filling operation. Toward the end of the speed-controlled phase or in the initial period of the pressure-controlled phase, the filling situation in which the mold cavity is completely wetted with plasticizable compound is reached, the pressure of the compound inside the mold cavity still being relatively low. As a result of the continuation of the movement of an injection plunger or an extruder, this is followed by an increase in the internal mold pressure, accompanied by a reduction in the specific volume or an increase in the density of the molding compound located in the mold cavity. The extent of the compaction which can be achieved in this way depends not only on the prevailing temperature but also on the level of the pressure acting and the characteristic properties of the molding compound.

In particular for quality assurance, process optimization, process monitoring and process control purposes, pressure and temperature sensors are used, fitted in the injection mold in such a way that the sensor front contacts the plastic part to be produced. Such an arrangement is described for example in DE 101 14 228 A1. For measuring piezoelectric signals, highly insulating lines are generally used.

There are molds in which the part of the mold that forms part of the cavity is formed directly from a mold plate or in a mold plate. Usually used for this purpose, however, is an insert in a mold plate that can be exchanged, for example if it becomes worn or there is a design modification. The actual mold plate remains the same, only the insert is replaced.

There are also instances in which inserts have to be exchanged and replaced by other inserts within an extremely short time during production, in order to produce new molded parts with new geometries. In such instances, the injection mold that is clamped on the machine continues to be used unchanged, while only the mold inserts are replaced. It is even conceivable for the change of such an insert to be performed fully automatically with the aid of a robot.

In practice, not only injection molds with a single mold cavity and a single mold insert are used but also multi-cavity molds with a mold insert respectively for each cavity. Here, too, these mold inserts are exchanged in the way described above for various reasons.

The present invention is based on the problem of providing a device of the aforementioned type with which sensors, in particular for pressure and temperature, can be used even in the case of molds in which the cavities are formed by inserts.

SUMMARY OF THE INVENTION

To solve the foregoing problem, in the insert there is, toward the inner cavity wall formed by the insert, a sensor that is connected to a first coupling part, which is assigned a second coupling part in the mold plate.

This means that, when an insert is taken out, the coupling is also disconnected and when a new insert is fitted, a new coupling with a new sensor can be established without any difficulty. In this case, the couplings must be made as small as possible to allow them also be used in the case of very small mold inserts.

The coupling itself is configured as a quick-acting coupling without any interlock. The simplest type of coupling is likely to be a plug-in coupling in which a plug is inserted into a socket.

Should the sensor lie very close to its coupling part, an extra line is not needed. Generally, however, the sensor is likely to be connected to its first coupling part by means of a line, while a line connects to the second coupling part, for example a line to a connection to a signal evaluation unit.

In one exemplary embodiment, the sensor is an internal cavity pressure sensor. With this sensor, it must be ensured that the lines are highly insulating, since even contact with a finger is sufficient to negate the insulation because of perspiration on the finger. These lines preferably have a resistance of at least $10^{12}$ ohms.

Furthermore, WO 02/082023 A1, for example, proposes a method for automatically detecting the sensitivity of sensors, in which the sensor is allocated a resistance of a specific magnitude, by which the sensor is assigned to a specific sensor group with a predetermined sensitivity range. In other words, the sensitivity of the internal mold pressure sensor is coded with the aid of a resistance. For this information, in the case of the present invention an additional line must be provided and also decoupled.

In another exemplary embodiment, a temperature sensor is arranged in the insert. In this case, the coupling for the sensor must be designed as a so-called compensating line. In other words, the line must consist of the same material as the thermocouple itself. There are various material compositions for a thermocouple. The nickel/chromium/nickel composition is only mentioned as an example. If such a thermocouple is selected, the line should also consist of the same material.

Incidentally, the present invention can be used for disconnecting not only highly insulating piezoelectric lines but also lines that are not highly insulating.

BRIEF DESCRIPTION OF THE DRAWINGS

Further advantages, features and details of the invention emerge from the following description of preferred exemplary embodiments and with reference to the drawing, in which.

DETAILED DESCRIPTION

Figure 1:
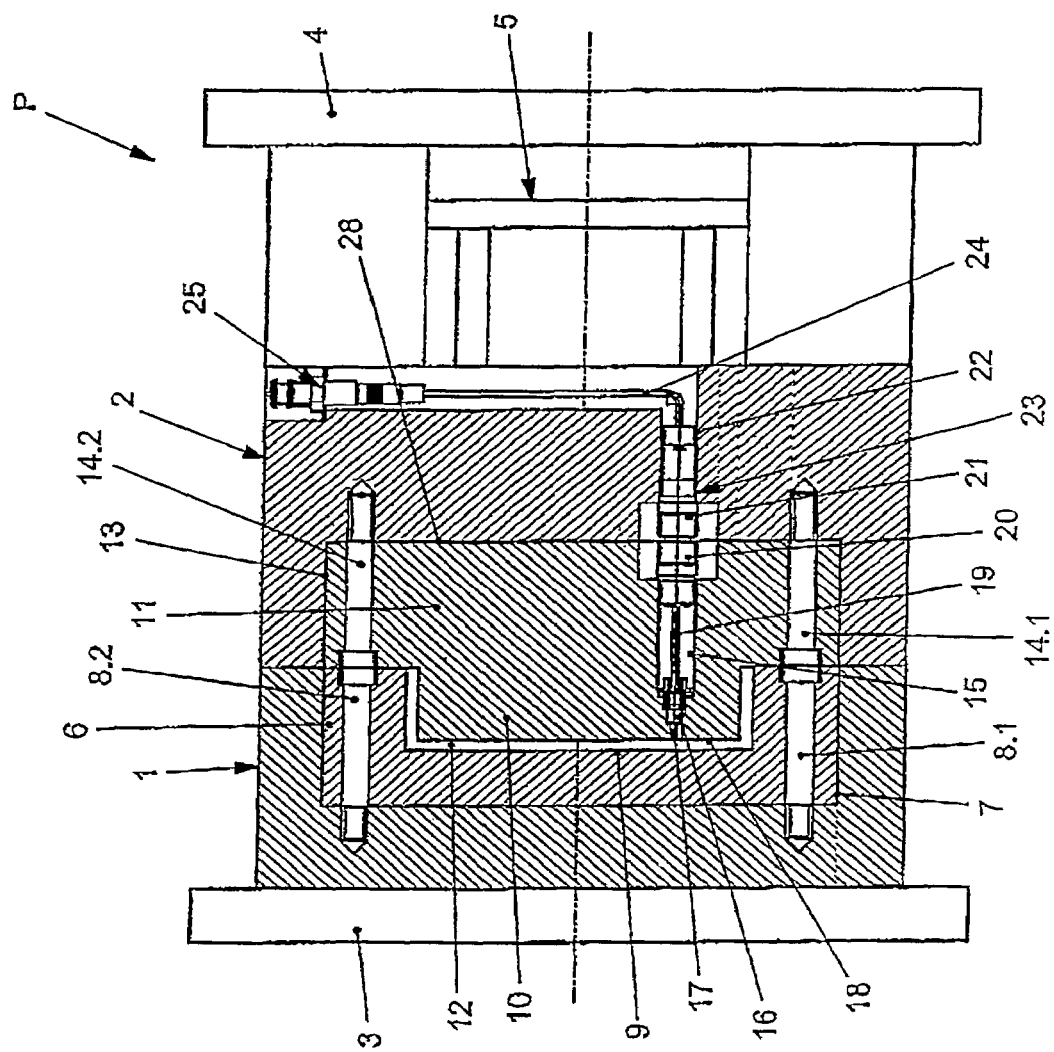
FIG. 1 shows a side view of a mold, partly represented in cross section.

According to FIG. 1, an injection mold P has a fixed mold plate 1 and a movable mold plate 2. Both plates 1 and 2 are respectively assigned a stationary platen 3 and 4, a mechanism 5 for moving the movable mold plate 2 also being provided between the platen 4 and the movable mold plate 2.

In the fixed mold plate 1 there is an insert 6, which is fixed in a corresponding recess 7 by fastening bolts 8.1 and 8.2. Formed in the insert 6 is a depression 9, which, together with a core 10, which protrudes from an insert 11 in the movable mold plate 2, forms a mold cavity 12.

The insert 11 is likewise removable in a recess 13 in the movable mold plate 2 and is fixed there by means of fastening bolts 14.1 and 14.2.

Formed in the insert 11 is a stepped bore 15, in the front region of which a sensor 16 is located. A sensor front 17 is located in the plane of an inner cavity wall 18. This forms the surface of the core 10.

In the stepped bore 15, the sensor 16 is connected by means of a line 19 to a first coupling part 20, which, together with a second coupling part 21, which is located in a bore 22 in the movable mold plate 2, forms a quick-acting coupling 23.

The second coupling part 21 is connected by means of a line 24 to a fixed connection 25, to which a signal evaluation unit (not shown in more detail) is then connected.

Figure 2:
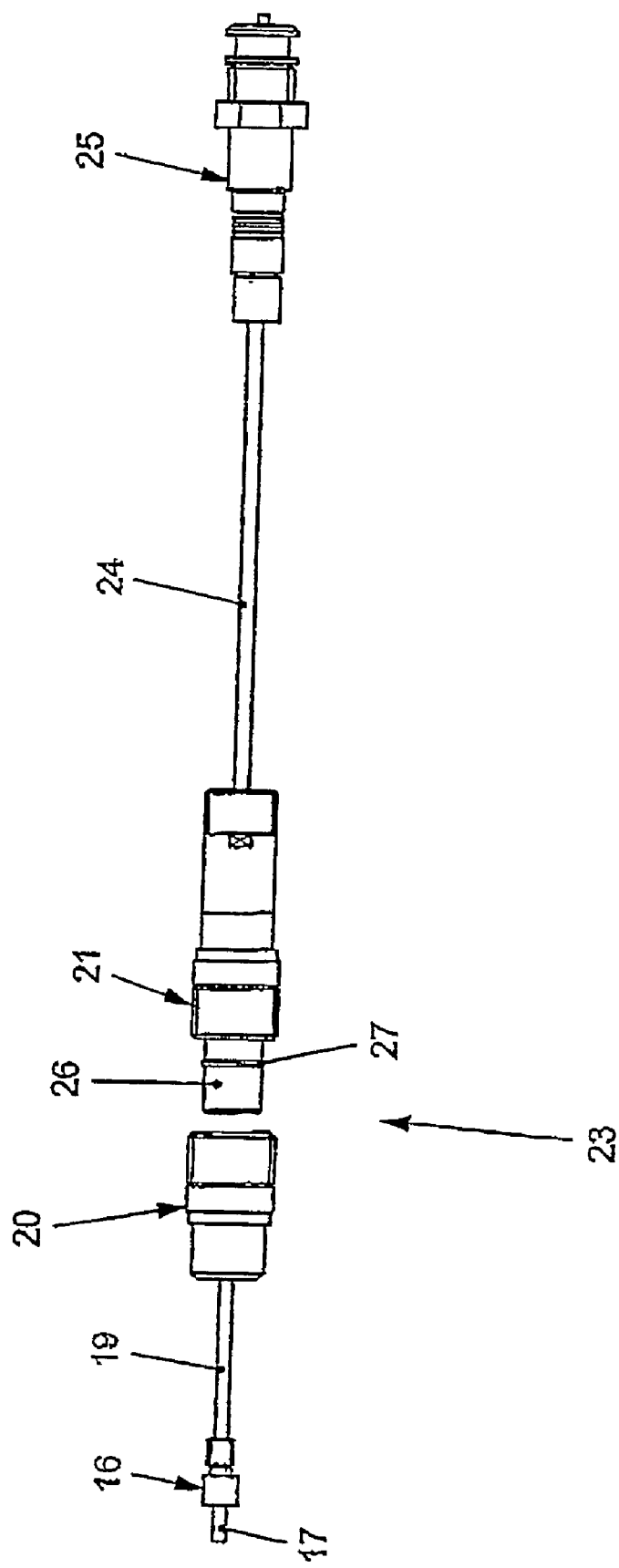
FIG. 2 shows a plan view of a sensor arrangement according to the invention.

In FIG. 2 it can be seen that the quick-acting coupling 23 is a plug-in coupling. The first coupling part 20 forms a socket into which a plug 26 of the second coupling part 21 can engage. An annular wall 27 secures a connection in the socket.

The present invention works as follows:

To determine an internal pressure or a temperature in the cavity 12 or of the melt in the cavity 12, the sensor 16 is inserted into the stepped bore 15 of the insert 11, so that the sensor front 17 lies in the plane of the inner cavity wall 18.

Toward the rear, the sensor 16 is connected by means of the line 19 to the first coupling part 20, the socket opening of which lies approximately in the plane of the bottom 28 of the insert.

In the first coupling part 20, the plug 26 of the second coupling part 21 is plugged. It is located in the bore 22 of the movable mold plate and is connected by means of the line 24 to the connection 25.

If a different molded part is then to be produced, and consequently the insert 11 is to be exchanged, the fastening bolts 14.1 and 14.2 are loosened and the insert 11 is pulled out from the recess 13. As this happens, the first coupling part 20 is also released from the second coupling part 21.

Then, a new insert with a new sensor is inserted into the recess 13, this new sensor also having a corresponding coupling part into which the plug 26 of the second coupling part can slide.

The invention claimed is:

1. A device for forming an object in a mold comprising a first mold insert and a second mold insert which define a mold cavity, wherein at least one of the first and second mold inserts has a bore which opens to the mold cavity, a sensor in the bore wherein a front surface of the sensor lies in a plane of an inner cavity wall of the at least one mold inserts which defines a portion of the mold cavity, the sensor is connected to a first coupling part located in the at least one mold insert by means of a first line, wherein the first line has a resistance of at least $10^{12}$ ohms and the first coupling part is connected to a second coupling part located in a mold plate carrying the at least one insert, and the second coupling part is connected by a second line to a signal evaluation unit, wherein the second line has a resistance of at least $10^{12}$ ohms.

2. The device as claimed in claim 1, wherein the coupling connection between the first and second coupling parts comprises a plug-in coupling without any interlock.

3. The device as claimed in claim 1, wherein the sensor determines an internal cavity pressure.

4. The device as claimed in claim 1, wherein the internal cavity pressure sensor is coded with the aid of the resistance.

5. The device as claimed in claim 4, wherein an additional decouplable line is provided for the coding.

6. The device as claimed in claim 1, wherein the sensor determines a temperature of the inner cavity wall.

7. The device as claimed in claim 6, wherein the line is designed as a compensating line and is of the same material as a thermocouple of the sensor.

* * * * *

(12) EX PARTE REEXAMINATION CERTIFICATE (9497th)
United States Patent
Bader et al.

(10) Number: US 7,476,095 C1
(45) Certificate Issued: Jan. 28, 2013

(54) DEVICE FOR FORMING OBJECTS, COMPRISING A COUPLABLE PRESSURE OR TEMPERATURE SENSOR

(75) Inventors: Christopherus Bader, Neftenbach (CH); David Dreher, Neftenbach (CH)

(73) Assignee: Priamus System Technologies AG, Schaffhausen (CH)

Reexamination Request:
No. 90/010,648, Sep. 28, 2009

Reexamination Certificate for:
Patent No.: 7,476,095
Issued: Jan. 13, 2009
Appl. No.: 11/662,129
Filed: Mar. 6, 2007

(21) Appl. No.: 90/010,648
(22) PCT Filed: Sep. 2, 2005
(86) PCT No.: PCT/EP2005/009464
§ 371 (c)(1), (2), (4) Date: Mar. 6, 2007
(87) PCT Pub. No.: WO2006/027173
PCT Pub. Date: Mar. 16, 2006

(30) Foreign Application Priority Data
Sep. 6, 2004 (DE) .......................... 10 2004 043 443

(51) Int. Cl.
*B28B 17/00* (2006.01)
(52) U.S. Cl. ...... 425/170; 425/144; 425/149; 425/192 R
(58) Field of Classification Search .................. None
See application file for complete search history.

(56) References Cited

To view the complete listing of prior art documents cited during the proceeding for Reexamination Control Number 90/010,648, please refer to the USPTO's public Patent Application Information Retrieval (PAIR) system under the Display References tab.

*Primary Examiner* — Krisanne Jastrzab

(57) ABSTRACT

A device for forming objects in a cavity, the device being at least partially formed by an insert in a molding plate. A sensor is arranged in the insert towards the inner wall of the cavity embodied by the insert, the sensor being connected to a first coupling part with which a second coupling part is to be associated in the molding plate.

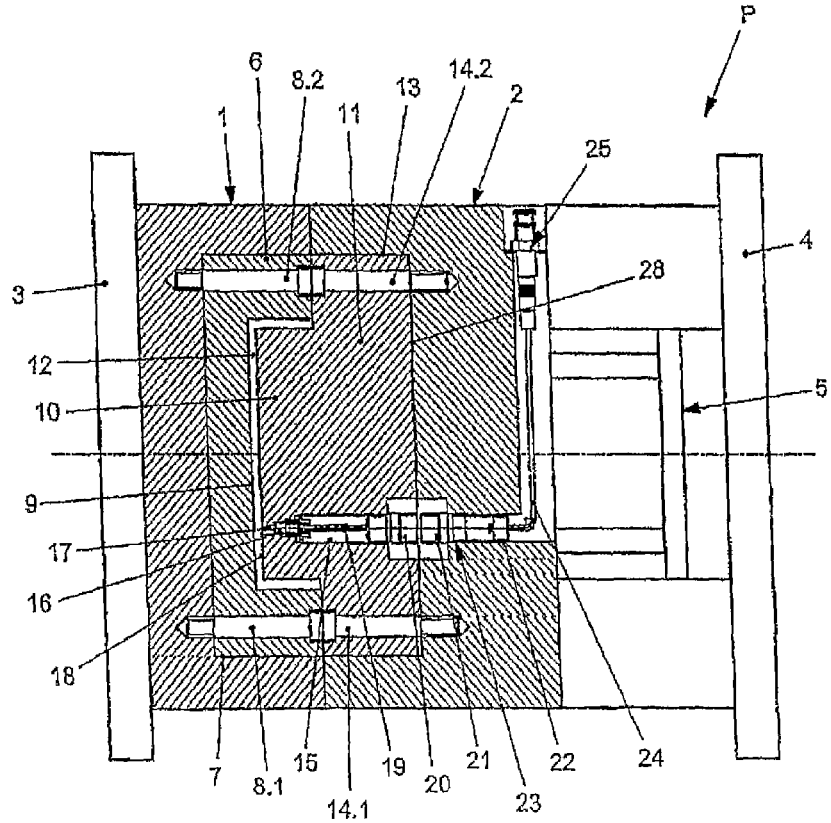

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

Claims 6-7 were not reexamined.

\* \* \* \* \*